C. A. GROTZ.
TRANSMISSION MECHANISM.
APPLICATION FILED JUNE 25, 1919.
1,353,390.
Patented Sept. 21, 1920.
3 SHEETS—SHEET 3.
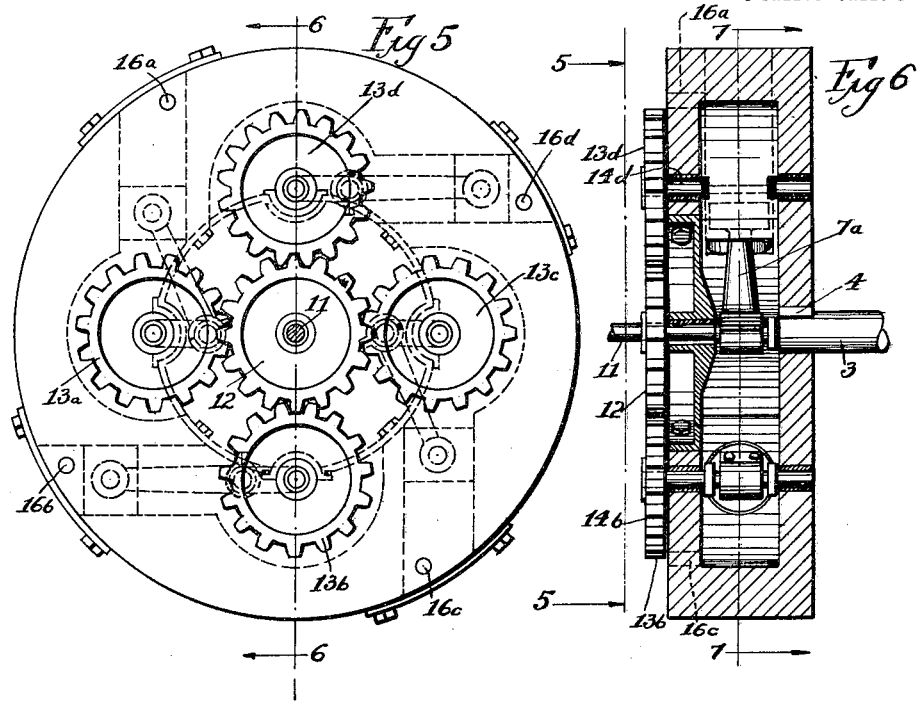
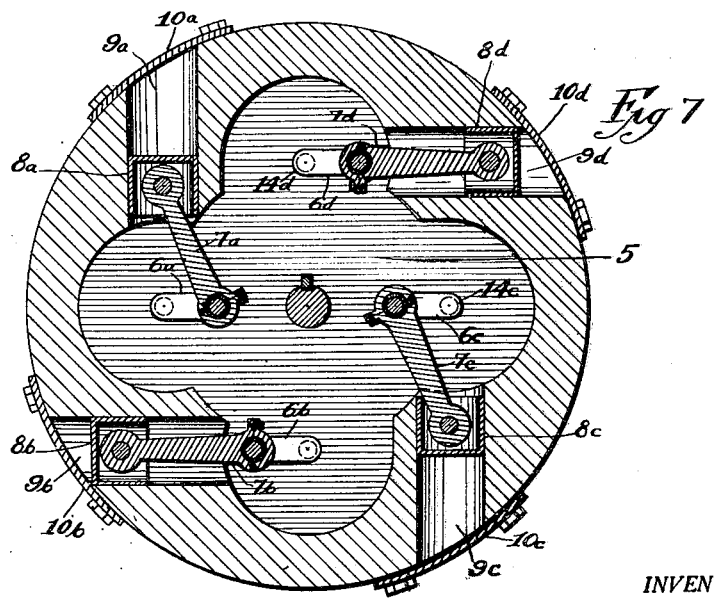
INVENTOR.
CHARLES A GROTZ
BY *Munn & Co*
ATTORNEYS.

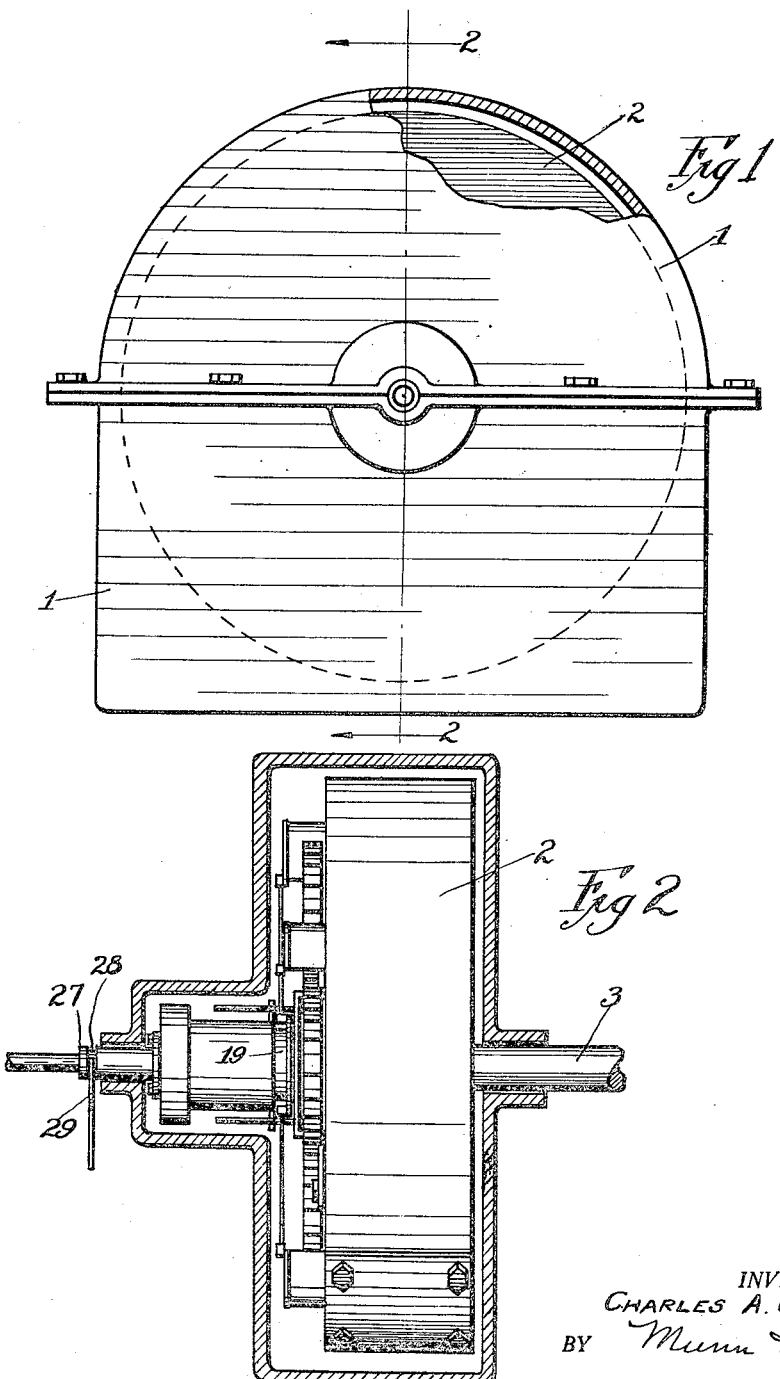

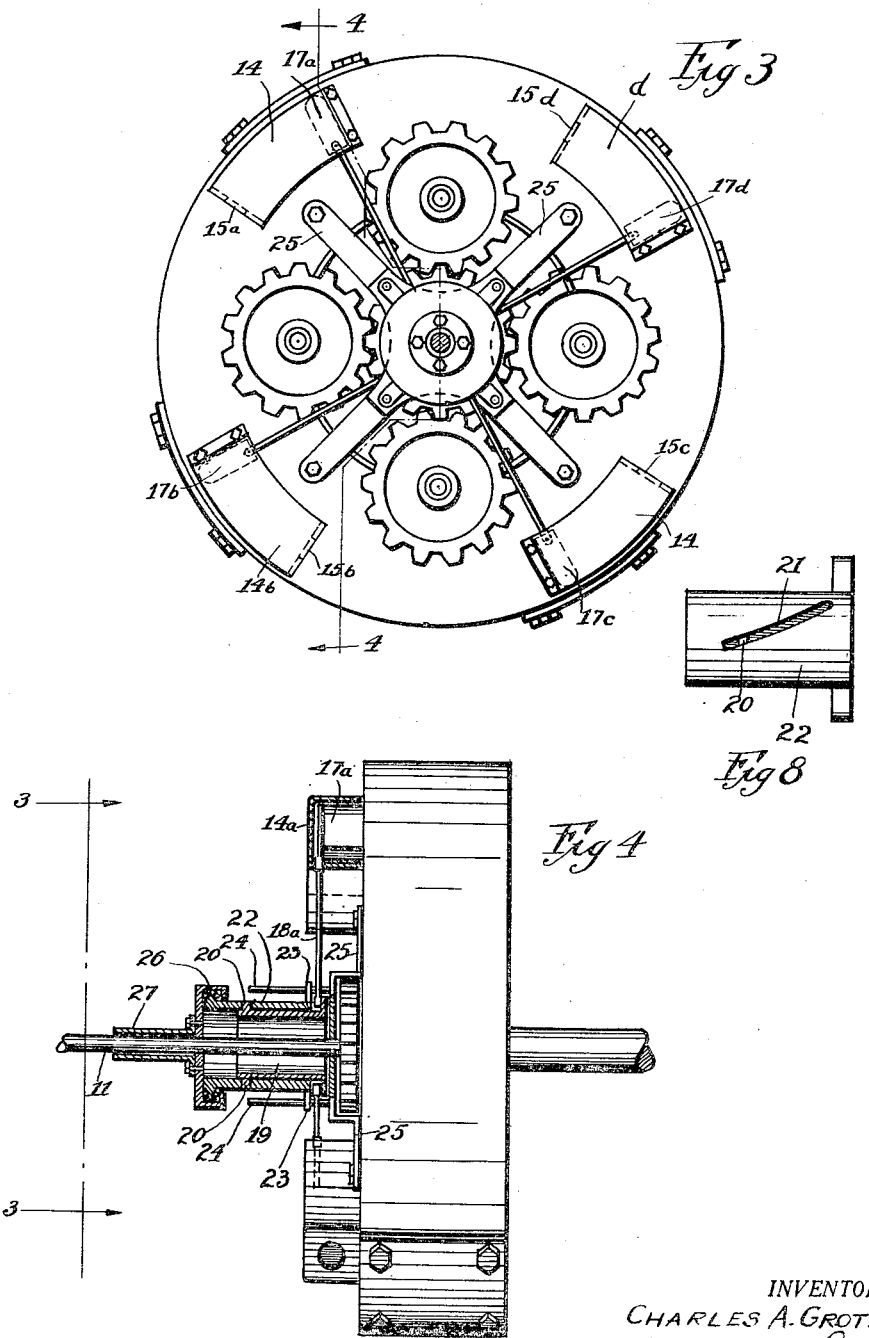

UNITED STATES PATENT OFFICE.

CHARLES A. GROTZ, OF CHICAGO, ILLINOIS.

TRANSMISSION MECHANISM.

1,353,390.  Specification of Letters Patent.  Patented Sept. 21, 1920.

Application filed June 25, 1919. Serial No. 306,757.

*To all whom it may concern:*

Be it known that I, CHARLES A. GROTZ, a citizen of the United States, and a resident of Chicago, county of Cook, and State of Illinois, have made certain new and useful Improvements in Transmission Mechanisms, of which the following is a specification.

My invention relates to improvements in transmission mechanism, and it consists in the combinations, constructions and arrangements herein described and claimed.

An object of my invention is to provide a transmission mechanism, by means of which any speed from zero to a maximum may be obtained by the manipulation of a single member, such as a foot pedal or a lever.

A further object of my invention is to provide a transmission mechanism which eliminates the bringing of gears into mesh, and the consequent noise and wear occasioned thereby.

A further object of my invention is to provide a transmission mechanism, by means of which various speeds may be obtained, said transmission being substantially noiseless, owing to the nature of the novel construction.

A further object of my invention is to provide transmission mechanism which may be used on all types of motor driven vehicles with equal facility.

Other objects and advantages will appear in the following specification, and the novel features of the invention will be particularly pointed out in the appended claims.

My invention is illustrated in the accompanying drawings, forming part of this application, in which Figure 1 is a side view of a transmission mechanism constructed according to my invention.

Fig. 2 is a section along the line 2—2 of Fig. 1 looking in the direction of the arrows.

Fig. 3 is a section along the line 3—3 of Fig. 4.

Fig. 4 is a section along the line 4—4 of Fig. 3.

Fig. 5 is a section along the line 5—5 of Fig. 6 looking in the direction of the arrows.

Fig. 6 is a section along the line 6—6 of Fig. 5 looking in the direction of the arrows.

Fig. 7 is a section along the line 7—7 of Fig. 6 looking in the direction of the arrows.

Fig. 8 is a detail view of a sleeve.

Referring now particularly to Figs. 1 and 2, I have shown therein a transmission casing 1, consisting of upper and lower parts bolted together and inclosing a fly wheel 2 (see Fig. 2). This fly wheel is rigidly secured to a drive shaft 3 by means of a key 4 (see Fig. 6), or in any other suitable manner. As will be seen from the drawings, especially Figs. 6 and 7, the central portion of the fly wheel is cut away to provide a space 5 for a series of crank shafts $6^a$, $6^b$, $6^d$ and $6^c$, which are connected to piston rods $7^a$, $7^b$, $7^c$ and $7^d$ respectively, each piston rod being associated with a piston, such as those shown at $8^a$, $8^b$, $8^c$ and $8^d$. The piston $8^a$ is in a bore $9^a$ extending inwardly from the outer periphery of the fly wheel, similar bores $9^b$, $9^c$ and $9^d$ receiving the pistons $8^b$, $8^c$ and $8^d$ respectively. The outer end of the bores are covered by plates $10^a$, $10^b$, $10^c$ and $10^d$ respectively.

On the opposite side of the fly wheel, in alinement with the shaft 3, is a driven shaft 11 which is rigidly connected with a central gear 12, said central gear being in mesh with an outer row of auxiliary gears $13^a$, $13^b$, $13^c$ and $13^d$ respectively, these gears being on the exterior of the fly wheel, as shown in Figs. 5 and 6. The gears $13^a$, $13^b$, $13^c$ and $13^d$ are connected to the respective crank shafts $6^a$, $6^b$, $6^c$ and $6^d$. As will be seen from Figs. 3 and 4, there are four housings $14^a$, $14^b$, $14^c$ and $14^d$ secured to the fly wheel at points between gears $13^a$, $13^b$, $13^c$ and $13^d$, these housings being arc shaped, and being provided with inlets $15^a$, $15^b$, $15^c$ and $15^d$ respectively. Each housing communicates with one of the bores $10^a$, $10^b$, $10^c$ and $10^d$ by means of a small passage, such as those shown at $16^a$, $16^b$, $16^c$ and $16^d$. Each opening is controlled by a valve $17^a$, $17^b$, $17^c$ and $17^d$ respectively. These valves are designed to be operated simultaneously and to this end, each is connected by a link, such as that shown at $18^a$, with a flange of a rotatable sleeve 19 (see Figs. 2 and 4). The sleeve 19 is provided with lugs 20 arranged to enter curved slots 21 in an outer sleeve 22, which is provided with flanges or extensions 23, through which guide rods 24, carried by a bracket 25, extend. The sleeve 22 has a swiveled connection at 26 with an operating sleeve 27, which may be grooved, as shown at 28 in Fig. 2, to receive a yoke 29.

From the foregoing description of the various parts of the device, the operation thereof may be readily understood. The bottom part of the casing 1 (see Fig. 1) is filled with oil, or the casing may be substantially all filled with oil. Assume first that the valves 17ª, 17ᵇ, 17ᶜ and 17ᵈ are open, so as to permit a full flow of oil into and out of the bores 9ª, 9ᵇ, 9ᶜ and 9ᵈ through the openings 16ª, 16ᵇ, 16ᶜ and 16ᵈ. The fly wheel 2 is revolving, being driven by the shaft 3. The gears 13ª, 13ᵇ, 13ᶜ and 13ᵈ are being carried around by the movement of the fly wheel, and as they pass around they roll on the central gear 11, the pistons 8ª, 8ᵇ, 8ᶜ and 8ᵈ working backwardly and forwardly in the bores of the cylinders, and pumping the oil in and out through the openings 16ª, 16ᵇ, 16ᶜ and 16ᵈ. This is the condition when there is no movement transmitted to the driven shaft 11. In other words, the transmission is in neutral. Now if it is desired to transmit movement to the shaft 11, the yoke 29 is manipulated so as to force the sleeve 22 inwardly. The movement of the sleeve 22 inwardly causes the sleeve 19 to turn on its axis, and to simultaneously move the links 18ª, 18ᵇ, 18ᶜ and 18ᵈ outwardly, thus causing the valves 17ª, 17ᵇ, 17ᶜ and 17ᵈ to begin to close the opening 16ª. Thus there is a resisting action to the flow of the oil through these openings, thus slowing up the movement of the gears, so that the central gear 12 is now dragged around by the load on the external gears, thus causing the slow turning of the driven shaft 11. It is obvious that when the openings 16ª, 16ᵇ, 16ᶜ and 16ᵈ are entirely closed, there will be no movement of the pistons whatever. In other words, the gears 13ª, 13ᵇ, 13ᶜ and 13ᵈ will not be revolving on their individual axes, but will carry the gear 12 around with them, so as to cause the shaft 11 to rotate at the same speed at which the fly wheel is being driven. This represents the maximum speed. Any speed may be imparted to the driven shaft 11 by manipulating the yoke 29 to close the valves or open them to an extent to give the speed desired.

Obviously the yoke 29 may be operated by a foot pedal or a hand lever, or any other suitable mechanism. It will be observed that the bores or cylinders are disposed in pairs symmetrically about the central axis of the fly wheel, and that the pistons on the opposite sides of the axis move in unison. This tends to equalize the force on the opposite sides, thus aiding in the uniform movement of the device. Where the casing 1 is not entirely filled with oil, the position of the housings 14ª, 14ᵇ, 14ᶜ and 14ᵈ permits the carrying of the oil, which has collected in the housings, up above the level of the oil in the casing 1, so that the housings are substantially filled with oil, which will constitute a supply for the cylinders, when the ports or openings 16ª, 16ᵇ, 16ᶜ and 16ᵈ are above the level of the oil in the casing. The rapid movement of the fly wheel tends to keep the oil in the housings, so that the effect is the same as if the casing 1 were completely filled with oil.

The device described obviates the grinding noise when gears are shifted in the ordinary transmission, and moreover, gives a flexibility of control involving speed from zero to a maximum, instead of the usual three speeds of the ordinary transmission mechanism.

It will be obvious that the transmission described above does not of itself give a reverse movement. The transmission is designed to be used in connection with any suitable mechanism which will give a forward and reverse movement to the drive shaft 3.

I claim:

1. A transmission mechanism, comprising a casing containing a fluid medium, a fly wheel disposed within the casing and having a plurality of cylinders adapted to communicate with the fluid-containing portion of the casing, a piston in each cylinder, a driving shaft secured to said fly wheel, a gear carried by the fly wheel and adapted to rotate about the central axis of the fly wheel, relatively to the latter, a driven shaft secured to said gear, a plurality of auxiliary gears arranged externally of and meshing with said first named gear, and means for transmitting the movement of said auxiliary gears to said pistons.

2. A transmission mechanism, comprising a casing containing a fluid medium, a fly wheel disposed within the casing and having a plurality of cylinders adapted to communicate with the fluid-containing portion of the casing, a piston in each cylinder, a driving shaft secured to said fly wheel, a gear carried by the fly wheel and adapted to rotate about the central axis of the fly wheel, relatively to the latter, a driven shaft secured to said gear, a plurality of auxiliary gears arranged externally of and meshing with said first named gear, means for transmitting the movement of said auxiliary gears to said pistons, and means for cutting off communication between each of said cylinders and said fluid-containing portion of the casing.

3. A transmission mechanism, comprising a casing containing a fluid medium, a fly wheel disposed within the casing and having a plurality of cylinders adapted to communicate with the fluid-containing portion of the casing, a piston in each cylinder, a driving shaft secured to said fly wheel, a gear carried by the fly wheel and adapted to rotate about the central axis of the fly wheel, relatively to the latter, a driven shaft secured to said gear, a plurality of auxiliary gears arranged externally of and meshing with said first named gear, means for transmitting the movement of said auxiliary gears to said pistons, a plurality of valves for controlling the communication of the cylinders with said fluid-containing portion of the casing, and means for actuating said valves simultaneously.

4. A transmission mechanism, comprising a casing containing a fluid medium, a fly wheel disposed within the casing and having a plurality of cylinders adapted to communicate with the fluid-containing portion of the casing, a piston in each cylinder, a driving shaft secured to said fly wheel, a gear carried by the fly wheel and adapted to rotate about the central axis of the fly wheel, relatively to the latter, a driven shaft secured to said gear, a plurality of auxiliary gears arranged externally of and meshing with said first named gear, means for transmitting the movement of said auxiliary gears to said pistons, a plurality of valves for controlling the communication of the cylinders with said fluid-containing portion of the casing, and means for actuating said valves simultaneously, said last named means being adjustable to cause the valves to assume any position between the open and the closed position.

5. A transmission mechanism, comprising a casing containing a fluid medium, a fly wheel disposed within the casing and having a plurality of cylinders, a piston in each cylinder, a driving shaft secured to said fly wheel, a gear carried by the fly wheel and adapted to rotate about the central axis of the fly wheel, relatively to the latter, a driven shaft secured to said gear, a plurality of auxiliary gears arranged externally of and meshing with said first named gear, means for transmitting the movement of said auxiliary gears to said pistons, and arc shaped housings carried by the fly wheel contiguous to said cylinders, and having communication therewith at one end and with the fluid-containing portion of the casing at the other end.

6. A transmission mechanism, comprising a casing containing a fluid medium, a fly wheel disposed within the casing and having a plurality of cylinders, a piston in each cylinder, a driving shaft secured to said fly wheel, a gear carried by the fly wheel and adapted to rotate about the central axis of the fly wheel, relatively to the latter, a driven shaft secured to said gear, a plurality of auxiliary gears arranged externally of and meshing with said first named gear, means for transmitting the movement of said auxiliary gears to said pistons, arc shaped housings carried by the fly wheel contiguous to said cylinders, and having communication therewith at one end and with the fluid-containing portion of the casing at the other end, and means for controlling communication between said arc shaped housings and said cylinders simultaneously.

CHARLES A. GROTZ.